(12) United States Patent
Incavo

(10) Patent No.: US 8,293,049 B2
(45) Date of Patent: Oct. 23, 2012

(54) TIRE SEALANT AND TIRE WITH SEALANT CONTAINING SILICA AND BALANCED ORGANOPEROXIDE DEPOLYMERIZED BUTYL RUBBER

(75) Inventor: Joseph Alan Incavo, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 435 days.

(21) Appl. No.: 12/629,444

(22) Filed: Dec. 2, 2009

(65) Prior Publication Data

US 2011/0126953 A1   Jun. 2, 2011

(51) Int. Cl.
  *B29C 73/16* (2006.01)
  *B60C 19/12* (2006.01)
(52) U.S. Cl. ......... 156/115; 152/502; 152/503; 523/166
(58) Field of Classification Search ............... 156/110.1, 156/156, 115; 152/502–508
  See application file for complete search history.

(56) References Cited

U.S. PATENT DOCUMENTS

| | | |
|---|---|---|
| 1,239,291 A | 9/1917 | Morse |
| 2,877,819 A | 3/1959 | Gibbs |
| 3,048,509 A | 8/1962 | Sweet et al. |
| 3,563,294 A | 2/1971 | Chien ............................ 152/346 |
| 3,939,133 A * | 2/1976 | Roodvoets .................. 525/332.5 |
| 4,140,167 A | 2/1979 | Bohm et al. ................. 152/346 |
| 4,171,237 A | 10/1979 | Bohm et al. ................. 156/115 |
| 4,206,796 A | 6/1980 | Chemizard .................... 153/347 |
| 4,228,839 A | 10/1980 | Bohm et al. ................. 152/347 |
| 4,286,643 A | 9/1981 | Chemizard et al. ........... 152/347 |
| 4,359,078 A | 11/1982 | Egan ............................ 152/347 |
| 4,895,610 A | 1/1990 | Egan ............................ 156/115 |
| 4,919,183 A | 4/1990 | Dobson ......................... 152/502 |
| 4,966,213 A | 10/1990 | Kawaguchi et al. ........... 152/504 |
| 6,837,287 B2 | 1/2005 | Smith, Sr. et al. ............ 152/503 |
| 6,962,181 B2 * | 11/2005 | Deevers et al. ............... 152/503 |
| 7,037,578 B2 * | 5/2006 | Lofgren ..................... 428/295.1 |
| 7,674,344 B2 * | 3/2010 | D'Sidocky et al. ......... 156/110.1 |
| 2003/0181612 A1 * | 9/2003 | Kawasaki et al. ............. 526/217 |
| 2003/0224275 A1 * | 12/2003 | Shimojo et al. .......... 430/108.22 |
| 2003/0230376 A1 * | 12/2003 | Smith et al. ..................... 156/115 |
| 2004/0110906 A1 * | 6/2004 | Fujisawa et al. ............ 525/331.9 |
| 2004/0144462 A1 * | 7/2004 | Zanzig et al. .................. 152/151 |
| 2004/0159386 A1 * | 8/2004 | Deevers et al. ................ 152/503 |
| 2005/0113502 A1 * | 5/2005 | Fitzharris Wall et al. ...... 524/425 |
| 2005/0205184 A1 * | 9/2005 | Fitzharris Wall .............. 152/502 |
| 2005/0205186 A1 * | 9/2005 | Wall et al. ...................... 152/504 |
| 2006/0254687 A1 * | 11/2006 | Sandstrom ..................... 152/504 |
| 2006/0275952 A1 * | 12/2006 | Gowda et al. .................. 438/122 |
| 2007/0044883 A1 * | 3/2007 | D'Sidocky et al. ............ 152/503 |
| 2008/0115872 A1 * | 5/2008 | Sandstrom et al. ............ 152/503 |
| 2008/0142138 A1 * | 6/2008 | Incavo et al. ................... 152/450 |
| 2009/0084482 A1 * | 4/2009 | Majumdar et al. ............. 152/504 |
| 2009/0159129 A1 * | 6/2009 | Kataoka et al. ................ 136/259 |

FOREIGN PATENT DOCUMENTS

| | | |
|---|---|---|
| EP | 1721932 | 11/2006 |
| EP | 1925466 | 5/2008 |
| EP | 2060414 | 5/2009 |

OTHER PUBLICATIONS

Mageli, O.L. and Kolczynzski. Reinforced Plastics Symposium, vol. 58, No. 3, 1966.*
Akrochem Rubber Chemicals Competitive Cross Reference, 2010.*
European Search Report completed Mar. 8, 2011.

* cited by examiner

*Primary Examiner* — Geoffrey L Knable
(74) *Attorney, Agent, or Firm* — Henry C. Young, Jr.

(57) ABSTRACT

The present invention relates to a tire puncture sealant and a pneumatic tire containing such puncture sealant as a built-in puncture sealant. The sealant composition contains silica reinforcement and butyl rubber depolymerized in the presence of a balanced and cooperative combination of organoperoxides comprised of a minor amount of 4,4-di(tertiary butylperoxy) valerate depolymerization initiator and a major amount of dicumyl peroxide depolymerization propagator, the combination of which has been observed to have a synergistic effect.

1 Claim, No Drawings

TIRE SEALANT AND TIRE WITH SEALANT CONTAINING SILICA AND BALANCED ORGANOPEROXIDE DEPOLYMERIZED BUTYL RUBBER

FIELD OF THE INVENTION

The present invention relates to a tire puncture sealant and a pneumatic tire containing such puncture sealant as a built-in puncture sealant. The sealant composition contains silica reinforcement and butyl rubber depolymerized in the presence of a balanced and cooperative combination of organoperoxides comprised of a minor amount of 4,4-di(tertiary butylperoxy) valerate depolymerization initiator and a major amount of dicumyl peroxide depolymerization propagator, the combination of which has been observed to have a synergistic effect.

BACKGROUND OF THE INVENTION

Various pneumatic tires have been proposed which contain a built-in sealant layer based upon a organoperoxide depolymerized butyl rubber layer. For example, see U.S. Pat. Nos. 4,895,610, 4,228,839, 4,171,237 and 4,140,167 and U.S. patent application Ser. Nos. 10/171,057, 10/368,259 and 2005/0205186.

Additional patent publications which propose various tire constructions which may involve built-in or built-on sealants for tires such as for example, U.S. Pat. Nos. 1,239,291, 2,877, 819, 3,048,509, 3,563,294, 4,206,796, 4,286,643, 4,359,078, 4,444,294, 4,895,610, 4,919,183 and 4,966,213.

In one embodiment, the built-in sealant layer may be derived from butyl rubber which contains precipitated silica with minimal, if any, rubber reinforcing carbon black and have an identifying color other than black.

In practice, the organoperoxide compound yields free radicals at an elevated temperature which operate to depolymerize the butyl rubber of the built-in sealant precursor composition within the tire itself to form the built-in sealant layer.

For this invention, it is considered herein to be important that the butyl rubber of the sealant composition be depolymerized by the organoperoxide generated free radicals to an extent that the modulus (G') for the resultant sealant layer is reduced to a value of 40 kPa or less, alternately and usually more desirably less than 26 kPa, (100° C., 1 Hertz, 5 percent strain), often desirably with a minimum of about 10 kPa. Accordingly, while a broad range of from about 10 to about 40 kPa might be useful for some tires, a more narrow range of from about 10 to about 28 kPa, or from about 16 to about 28 kPa might be desired, depending upon the tire itself, including tire size and intended tire service conditions, to promote sealant efficiency of the built-in tire sealant, namely to promote an ability to efficiently seal against various puncturing objects such as, for example, a nail.

Various individual organoperoxide compounds have heretofore been proposed for the depolymerization of the butyl rubber of the tire built-in sealant precursor layer including, for example, individual organoperoxides such as dicumyl peroxide and 4,4-di(tertiary butylperoxy) valerate.

However, in contrast, an entirely different manipulative approach is proposed as compared to a more simple use of an individual organoperoxide or simple mixture of organoperoxides to effect the formation of the depolymerized butyl rubber based built in sealant for a tire.

In practice, use of dicumyl peroxide for the silica-containing butyl rubber depolymerization has been considered as being desirable because, while it requires a higher temperature to effectively activate its free radical formation, an advantage to using dicumyl peroxide is that its byproducts tend to be primarily relatively high boiling point products which are liquid at room temperature (e.g. at about 23° C.), such as, for example, cumyl alcohol.

In practice, use of 4,4-di-(tertiary butylperoxy) valerate has been considered as being desirable for the silica-containing butyl rubber depolymerization of the tire because it tends to form the necessary free radicals at a lower temperature than that of the dicumyl peroxide. However, its byproducts tend to be significantly lower boiling point products such as, for example t-butyl alcohol.

Various decomposition related information for the dicumyl peroxide and 4,4-di(tertiary butylperoxy) valerate is provided in the following Table A.

TABLE A

|  | Activation Energy Kcal/mole | Half Life at 150° C., minutes | SDAT, self accelerated decomposition Temp. ° C. | Half Life Temperature 1 hour, ° C. |
|---|---|---|---|---|
| Dicumyl peroxide | 37 | 15 | 93 | 137 |
| 4,4-di(tertiary butylperoxy) valerate | 35 | 6.5 | 75 | 129 |

It is seen from Table A that while the activation energies for the dicumyl peroxide and the di(tertiary butylperoxy) valerate are similar, the indicated temperature at which the organoperoxide is initially significantly involved with its substantive decomposition in a sense of forming free radicals to promote decomposition of the butyl rubber is significantly lower for the di(tertiary butylperoxy) valerate, namely about 75° C., as compared to the higher temperature of about 93° C. for the dicumyl peroxide.

Therefore, as the rubber composition's temperature increases within the hot mold from, for example, about 23° C. to an ultimate temperature in a range of from about 150° C. to about 170° C., the very small amount of di(tertiary butylperoxy) valerate might initiate its substantive free radical generation significantly early in time, as the rubber composition's temperature approaches about 75° C., to initiate a beginning of a depolymerization of the butyl rubber which may occur before a substantive free radical generation by the dicumyl peroxide as the rubber composition's temperature proceeds to increase and approach a higher temperature of about 93° C.

Taking into account the significantly shorter half life of the di(tertiary butylperoxy) valerate free radical initiation, (reported half life of about 6.5 minutes as compared to about 15 minutes for the dicumyl peroxide), it is possible that an extended continuation of depolymerization of the butyl rubber might be largely dependent upon the extended free radical generation activity of the dicumyl peroxide.

Therefore, the 4,4-di(tertiary butylperoxy) valerate might be significantly more active in a sense of having a considerably greater free radical formation rate, and therefore a considerably greater promotion of butyl rubber depolymerization over a shorter time, than the dicumyl peroxide.

The 4,4-di-(tertiary butylperoxy) valerate might therefore be a favored organoperoxide to initiate depolymerization of the butyl rubber because it not only begins its free radical formation at a significantly lower temperature than the dicumyl peroxide, but it apparently has a greater rate of free radical formation.

It is to be appreciated that the presence of the silica in the butyl rubber based sealant precursor layer complicates the butyl rubber depolymerization process both in the sense that the silica reacts with (for example by its hydroxyl groups) the organoperoxide to form byproducts from the organoperoxide decomposition as well in a sense that adsorbing of the organoperoxide onto the precipitated silica thereby tends to inhibit or retard the rate and degree of depolymerization of the butyl rubber of the sealant precursor.

Accordingly, it is therefore a significant undertaking of this invention to evaluate and determine if the contrasting properties of the respective organoperoxides can be utilized in a way to enhance depolymerization of the butyl rubber in the sealant precursor composition in situ within a tire configuration to ultimately form the built-in silica-containing sealant layer.

For such evaluation, it is to be appreciated that the depolymerization of the butyl rubber in the sealant precursor is to be accomplished somewhat within the time and temperature cure conditions of the tire in which the built-in sealant is formed. It is to be recognized that the time and temperature for the curing of the tire may vary somewhat depending upon nature of the tire itself which may include, for example, the size of the tire. For evaluation purposes in the laboratory, a time and temperature for the depolymerization of the butyl rubber in sealant precursor composition to reach an appropriate modulus (G') value may be used to somewhat approximate the time and temperature, or an average time and temperature, for a typical tire cure condition.

Such determination is to further evaluate if a greater control over the degree and rate of depolymerization of the silica-containing butyl rubber can be accomplished to more effectively convert the sealant precursor to the built-in sealant and to achieve a suitable modulus (G') for the sealant composition use of the combination organoperoxides.

While both organoperoxides have heretofore been proposed for depolymerization of butyl rubber for a tire built-in sealant, the aforesaid manipulative combination of free radical initiation and associated depolymerization initiation combined with cooperative propagation of continued free radical initiation and associated propagation of continued butyl rubber depolymerization is a significant aspect of this invention, and is not an obvious manipulative combination without a trial and error evaluation and is a significant departure from past practice.

A further embodiment of the invention, in combination of the aforesaid specified combination of organoperoxides with differentiating activation temperatures, is a treatment of the precipitated silica with polyethylene glycol, prior to the organoperoxide addition to the rubber composition, in order to inhibit, retard and/or significantly prevent significant contact of hydroxyl groups contained on the precipitated (synthetic amorphous) silica aggregates by the combination of the aforesaid organoperoxides.

Accordingly, in one embodiment, the precipitated silica may be treated in situ within the rubber composition by the polyethylene glycol prior to addition of the organoperoxide combination, or, in another embodiment, may be pre-treated by the polyethylene glycol prior to addition of the silica to the rubber composition. The polyethylene glycol is a low molecular weight polyalkylene oxide polymer, which might sometimes be referred to as a polyalkylene glycol (e.g. polyethylene glycol).

Indeed, it is considered herein that significant challenges are presented using the precipitated silica (optionally also including the clay when used in combination with the precipitated silica), particularly when used in place of rubber reinforcing carbon black for reinforcing filler for a non-black colored sealant for the above reasons.

Therefore, as indicated above, when the precipitated silica is used, it is preferably treated with a polyalkylene glycol (e.g. polyethylene glycol).

In a further embodiment of the invention, while the butyl rubber, as a copolymer of isobutylene and isoprene, may be composed of greater than one weight percent units derived from isoprene, it is preferred that it is composed of from only about 0.5 to 1.0 weight percent units derived from isoprene. The use of a butyl rubber with such low unsaturation content is to promote a more efficient depolymerization by treatment with the organoperoxide where it is envisioned that the presence of the double bonds within the butyl rubber may tend to terminate its depolymerization when the depolymerization process reaches the double bond unsaturation in the butyl rubber.

In an additional embodiment of the invention, to promote better processing of the butyl rubber-based sealant precursor composition, it is desired to use a butyl rubber that has a relatively high Mooney viscosity (ML+8) value at 125° C. in a range of from about 25 to about 60, alternately from about 40 to about 60.

Thus a butyl rubber of very low isoprene-based unsaturation content (for more effective depolymerization of the butyl rubber) and relatively high Mooney viscosity (to promote better physical handling of the sealant precursor composition) is a desirable combination.

In practice, it is desired herein for the butyl rubber-based sealant precursor composition to have a modulus (G') physical property, (at a 5 percent dynamic strain at 100° C. and 1 hertz) in a range of about 170 to about 350 kPa, alternately in a range of from about 175 to about 300 kPa.

For such purpose, it is desired herein for the depolymerized butyl rubber sealant composition to have a significantly lower storage modulus (G') physical property as heretofore indicated.

In practice, such modulus (G') may be determined, for example, by an RPA (Rubber Process Analyzer) instrument which measures the strain sweep at 100° C. at 1 Hertz over a range of, for example, from 1 to 50 percent strain. Such storage modulus (G') measurement for rubber samples is well known to those having skill in such art. Such a Rubber Process Analyzer is RPA 2000™ instrument by Alpha Technologies, formerly the Flexsys Company and formerly the Monsanto Company. References to an RPA-2000 instrument may be found in the following publications: H. A. Palowski, et al, *Rubber World*, June 1992 and January 1997, as well as *Rubber & Plastics News*, Apr. 26 and May 10, 1993.

In the description of this invention, the term "phr" is used to designate parts by weight of an ingredient per 100 parts of elastomer unless otherwise indicated. The terms "elastomer" and "rubber" are used interchangeably unless otherwise indicated. The terms "cure" and "vulcanize" are used interchangeably unless otherwise indicated.

SUMMARY AND PRACTICE OF THE INVENTION

In accordance with this invention a tire sealant precursor composition is provided which is comprised of:
(A) butyl rubber,
(B) combination of organoperoxides comprised of:
(1) 4,4-di-(tertiary butylperoxy) valerate, and
(2) dicumyl peroxide;

wherein the ratio of dicumyl peroxide to 4,4-di-(tertiary butylperoxy) valerate is in a range of from about 3/1 to about 30/1, alternately in a range of from about 4/1 to about 24/1;

(C) reinforcing filler comprised of:
   (1) precipitated silica and rubber reinforcing carbon black, or
   (2) precipitated silica and colorant having a color other than black with a substantial exclusion of (e.g. without) rubber reinforcing carbon black, or
   (3) precipitated silica, a colorant having a color other than black and a minimal amount of rubber reinforcing carbon black (e.g. from about 0.5 to about 2 phr) so long as the sealant is of a non-black color, and (D) optionally at least one of clay (e.g. kaolin clay) and calcium carbonate, desirably clay.

In practice, it is desired that the organoperoxides are limited to said 4,4-di-(tertiary butylperoxy) valerate and dicumyl peroxide with less than about 10 percent of the organoperoxides being organoperoxides other than said 4,4-di-(tertiary butylperoxy) valerate and dicumyl peroxide.

In practice, it is desired that the precipitated silica is a pre-treated precipitated silica in a sense of being treated in situ within the sealant precursor composition prior to addition of said combination of organoperoxides or pre-treated prior to addition of the precipitated silica to the rubber composition, with a polyethylene glycol having a weight average molecular weight in a range of from about 2,000 to about 15,000, alternately about 2,000 to about 10,000.

A purpose of such pre-treatment of the precipitated silica is to at least partially inhibit, with the pre-treated precipitated silica therefore being resistive to, absorption of the dicumylperoxide and 4,4-di-(tertiarybutylperoxy) valerate combination onto the precipitated silica.

In further accordance with the invention, a tire is provided which contains said tire sealant precursor composition, particularly in a form of a layer of such composition.

The butyl rubber based sealant precursor layer is built into the tire to form a tire assembly and its butyl rubber component is at least partially depolymerized in situ in the presence of said combination of said 4,4-di-(tertiary butylperoxy) valerate and dicumyl peroxide during a subsequent curing of the tire at an elevated temperature in a suitable mold to form a self-sealing tire having the resultant built-in sealant layer.

In further accordance with this invention, a pneumatic rubber tire is provided containing a puncture sealant, particularly as a built-in puncture sealing layer, comprised of the aforesaid combined 4,4-di-(tertiary butylperoxy) valerate and dicumyl peroxide depolymerized butyl rubber.

As previously indicated, it is desired that the precipitated silica is a polyethylene glycol pre-treated precipitated silica in a sense of being treated in situ within the sealant precursor composition prior to addition of said combination of organoperoxides or pre-treated prior to addition of the precipitated silica to the rubber composition, with a polyethylene glycol having a weight average molecular weight in a range of from about 2,000 to about 15,000, alternately about 2,000 to about 10,000.

In additional accordance with this invention, a pneumatic rubber tire is provided with a puncture sealing layer, wherein said puncture sealant layer is said butyl rubber sealant precursor having its butyl rubber partially depolymerized in situ in said tire with said combination of organoperoxides as 4,4-di-(tertiary butylperoxy) valerate and dicumyl peroxide.

In further accordance with this invention, a pneumatic tire is provided having said sealant layer positioned:

(A) between a tire innerliner rubber layer and tire rubber carcass, or (B) between two tire innerliner rubber layers, (and therefore covered by at least one tire innerliner rubber layer), or (C) on an exterior surface of a tire innerliner rubber layer.

In additional accordance with this invention, such pneumatic tire is provided wherein said sealant layer:

(A) extends from one shoulder of the tire to the other shoulder of the tire through the crown region of the tire;

(B) is positioned in at least one tire shoulder area region and extends into at least a portion of the adjoining tire sidewall portion of the tire, or (C) extends from sidewall-to-sidewall of the tire through the tire crown region.

In practice, said puncture sealing layer is preferably comprised of, based upon parts by weight per 100 parts by weight of said partially depolymerized butyl rubber:

(A) said partially depolymerized butyl rubber (by said depolymerization of said butyl rubber in situ in said tire by said combination of 4,4-di-(tertiary butylperoxy) valerate and dicumyl peroxide;

(B) particulate reinforcing filler comprised of:
   (1) precipitated silica (e.g. from about 5 to about 50 phr) and rubber reinforcing carbon black; or
   (2) precipitated silica (e.g. about 5 to about 50 phr of precipitated silica);

(C) optionally from zero to 6, alternately about 0.5 to about 5, phr of short organic fibers;

(D) optionally a colorant of other than a black color when said reinforcing filler is said precipitated silica or said precipitated silica and up to about 2 phr of rubber reinforcing carbon black so long as said sealant is of a color other than black; preferably a colorant selected from at least one of organic pigments, inorganic pigments and dyes, and preferably from organic pigments and inorganic pigments;

(E) optionally from zero to about 20, alternately about 2 to about 15, phr of rubber processing oil, preferably a rubber processing oil having a maximum aromatic content of about 15 weight percent, and preferably a naphthenic content in a range of from about 35 to about 45 weight percent and preferably a paraffinic content in a range of about 45 to about 55 weight percent, and (F) optionally at least one of clay (e.g. kaolin clay) and calcium carbonate in an amount of from, for example, 1 to about 15 phr.

For the practice of this invention, as previously indicated, representative examples of polyalkylene glycols for said pre-treatment of the precipitated silica are, for example, polyethylene glycols having an average (weight average) molecular weight in a range of from about 2,000 to about 15,000, alternately from about 2,000 to about 10,000, are preferred.

Examples of commercially available polyethylene glycols may be, for example, those such as Carbowax™ PEG 3350 as well as Carbowax™ PEG 8000 from the Dow Chemical Company with said Carbowax™ PEG 8000 reportedly having a weight average molecular weight in a range of about 7,000 to about 9,000 as determined by its NIR (near infrared) method 1B-ZMETH1.3. A further discussion concerning various polyalkylene oxide polymers, and particularly polyethylene glycols including said Carbowax PEG 8000 may be found, for example, although not intended to be limitive, in U.S. Pat. Nos. 6,322,811 and 4,082,703.

In practice, various clays may be used. Representative of such clays are, for example, kaolin clays. It is envisioned herein that a benefit of utilization of such clay is to provide a modified, or tempered, degree of reinforcement, as compared to the silica, for the sealant precursor composition to aid in its aforesaid processing and also to aid, in combination with the silica, in providing the aforesaid suitable storage modulus (G') of the resultant depolymerized butyl rubber-based sealant composition.

In practice, various synthetic amorphous silicas may be used, such as, and preferably, precipitated silica. Representative of such precipitated silicas are, for example and not intended herein to be limitative, HiSil 546™ and HiSil 532™ from PPG Industries, Hubersil 4155™ from the J. M. Huber Company and Ultrasil™ VN2 and VN3 from the Degussa Company.

The optional various rubber processing oils are well known to those having skill in such art. For this invention, a rubber processing oil having a low aromaticity content is preferred, namely a rubber processing oil having an aromaticity content of less than about 15 weight percent. Such rubber processing oil may be composed of, for example, about 35 to about 45 weight percent naphthenic content, about 45 to about 55 weight percent paraffinic content and an aromatic content of less than about 15 weight percent (e.g. from about 10 to about 14 weight percent). It is considered herein that a representative of such preferred rubber processing oil is Tufflo 100™ from the Barton Solvent Company. The rubber processing oil, in relatively low concentrations, is seen herein to aid in mixing the ingredients for the sealant precursor composition and to aid in promoting the aforesaid processing of sealant precursor composition.

Optionally, the sealant (the sealant precursor and the resultant sealant) may contain short fibers may be selected from, for example, cotton fibers and from synthetic fibers selected from rayon, aramid, nylon and polyester fibers, and their mixtures. In practice, such cotton short fibers may have an average length, for example, in a range of up to about 200 microns (e.g. an average length of about 150 microns) and the synthetic (e.g. the polyester and nylon fibers) may have an average length, for example, of up to a maximum of about 2,500 microns. The short fibers are considered herein to aid in promoting the effectiveness of the sealing ability of the resultant sealant composition. In relatively low concentrations, such synthetic fibers are not seen herein as significantly interfering with the processing of the sealant precursor composition yet as promoting the effectiveness of the resultant built-in sealant layer for its puncture sealing ability.

In practice, various colorants may be used where a sealant is desired having a color other than black. For example, such colorant may contain titanium dioxide. For example, the colorant of such sealant composition may preferably be composed of titanium dioxide where a white colored sealant layer is desired. Also, such colorant may contain, or be comprised, of titanium dioxide as a color brightener together with at least one non-black organic pigment and/or non-black inorganic pigment or dye.

Various optional colorants may be used to provide a non-black color to the sealant and sealant precursor composition, if a non-black color is desired. Representative of such colorants are, for example, yellow colored colorants as Diarylide Yellow™ pigment from PolyOne Corporation and Akrosperse E-6837™ yellow EPMB pigment masterbatch with an EPR (ethylene/propylene rubber) from the Akrochem Company. As discussed above, such yellow colored pigment may be used in combination and therefore together with titanium dioxide.

It is appreciated that the organoperoxides, namely the 4,4-di-(tertiary butylperoxy) valerate butyl rubber decomposition initiator and the dicumyl peroxide butyl rubber decomposition facilitator may be provided on a mineral carrier such as, for example calcium carbonate or a combination of calcium carbonate and calcium silicate.

In practice, a pneumatic tire having a puncture sealing ability comprised of an assembly of components comprised of an outer circumferential (sulfur curable) rubber tread, (sulfur curable) rubber carcass supporting said tread and an inner (sulfur curable) halobutyl rubber-based tire innerliner layer, may be prepared by, for example:

(A) positioning a layer of said sealant precursor, (exclusive of sulfur curative), between said tire innerliner rubber layer and said tire rubber carcass to form a tire assembly thereof, and (B) vulcanizing said tire assembly in a suitable mold at an elevated temperature, in a range of from, for example, about 130° C. to about 175° C., for a sufficient period of time to partially depolymerize said butyl rubber and thereby form a built-in sealant layer in said tire.

In practice, it is conventionally preferred that the butyl rubber and precipitated silica are blended in at least one sequential preparatory, or non-productive, mixing stage in the absence of the organoperoxides followed by a final, or productive, mixing stage in which the organoperoxides are added.

Conventionally, the non-productive mixing stage(s) may be conducted, for example, by mixing the ingredients to a temperature, for example, in a range of from about 110 to about 150° C. and the subsequent productive mixing stage may be conducted, for example, by mixing the ingredients to a temperature in a range of from about 85 to about 100° C.

A significant aspect of this invention is the at least partial depolymerization of the butyl rubber layer in situ in the tire during the vulcanization of the tire itself in a suitable mold at an elevated temperature via said combination of the organoperoxides which may also include a rubber reinforcing carbon black, particularly where it is acceptable for the sealant to be black in color, to create the built-in puncture sealant layer.

This is considered herein to be significant because said butyl rubber sealant precursor composition is conveniently processable as a rubber composition which can be suitably built as a rubber layer into a tire.

In practice, upon vulcanization, or curing, of the tire assembly under conditions of elevated temperature, a major portion of the uncured butyl rubber composition is considered herein to be depolymerized, where the butyl rubber depolymerization is initiated by the 4,4-di-(tertiary butylperoxy) valerate and propagated by the dicumyl peroxide together with the 4,4-di-(tertiary butylperoxy) valerate.

In practice, said tire innerliner halobutyl rubber-based layer is typically a sulfur curative-containing halobutyl rubber composition of a halobutyl rubber such as for example chlorobutyl rubber or bromobutyl rubber.

Such tire halobutyl rubber-based innerliner layer may also contain one or more sulfur curable diene-based elastomers such as, for example, cis 1,4-polyisoprene natural rubber, c is 1,4-polybutadiene rubber and styrene/butadiene rubber, and their mixtures, or more preferably a combination of one or more of said halobutyl rubbers and said diene based elastomers.

As the tire is vulcanized together with the butyl rubber-based rubber composition layer (the sealant layer precursor), the butyl rubber of the butyl rubber-based composition layer which is to become the sealant layer, becomes partially depolymerized, preferably to an extent that its aforesaid resultant storage modulus (G') physical property, at a 5 percent dynamic strain at 100° C. and 1 hertz, is, for example, in a range of from about 10 to about 100 kPa, alternately, and usually more desirably, in a range of from about 10 to about 40 kPa and further alternately in a range of from about 10 to about 28 kPa, as hereinbefore reported.

In effect, the butyl rubber in the butyl rubber based composition sealant layer is depolymerized to a low viscosity to form a tacky material which has puncture sealing properties. Thus, the butyl rubber composition sealant precursor layer is transformed into a puncture sealant layer during the curing of the tire. This at least partial depolymerization of the butyl rubber composition layer is effectuated by the presence of a combination of the free radical-generating organoperoxides.

In practice, the butyl rubber composition as the sealant precursor contains a sufficient amount of the aforesaid combination of free radical-generating organoperoxides to cause the butyl rubber to partially depolymerize, which may be, for example, in a range of from about 0.5 to about 15 phr of the combination of active organoperoxide depending somewhat upon the time and temperature of the tire curing operation and the degree of depolymerization desired.

The various components of the sealant layer can be mixed together using convenient rubber mixing equipment, particularly an internal rubber mixer. The rubber composition used in the sealant precursor layer typically has sufficient viscosity and unvulcanized tack to enable its incorporation into an unvulcanized tire without significantly departing from conventional tire building techniques.

In an exemplary method of this invention, the butyl rubber-based sealant precursor composition can be formed into a rubber strip by using conventional equipment such as a calender, extruder, or any combination thereof, and the rubber strip assembled into the tire. In building the tires of this invention a rubber innerliner of a butyl rubber based (e.g. bromobutyl rubber) rubber composition is first applied to a building drum and then the strip of butyl rubber based sealant precursor layer is applied to the layer of innerliner and thereafter the remainder of various carcass plies and layers of the tire assembly. The butyl rubber based sealant precursor layer is thereby assembled into the unvulcanized tire assembly of components between an innerliner layer and tire carcass.

The thickness of the sealant composition layer can vary greatly in an unvulcanized puncture sealant containing tire. Generally, the thickness of the sealant composition layer may range from about 0.13 cm (0.05 inches) to about 1.9 cm (0.75 inches). In passenger tires it is normally desired for the sealant composition layer to have a thickness of about 0.32 cm (0.125 inches) whereas for truck tires, a thickness of about 0.76 cm (0.3 inches) or greater might be desired.

After the unvulcanized pneumatic rubber tires of this invention are assembled they are vulcanized using a normal tire cure cycle. The tires of this invention can be cured over a wide temperature range. For example, passenger tires might be cured at a temperature ranging from about 130° C. to about 170° C. and truck tires might be cured at a temperature ranging from about 130° C. to about 170° C. Thus, a cure temperature may range, for example, from about 130° C. to about 170° C. and for a period of time (e.g. from about 10 to about 45 minutes or more depending somewhat upon the size of the tire and the degree of desired depolymerization of the butyl rubber as well as the thickness of the sealant layer itself) and sufficient to at least partially depolymerize said sealant precursor layer.

Accordingly, in one aspect of the invention, a self-sealing pneumatic rubber tire of this invention is envisioned wherein the tire has sidewalls, a supporting carcass, inextensible beads, an innerliner (air barrier layer), a sealant layer, and an outer circumferential tread (tread portion). The individual sidewalls extend radially inward from the axial outer edges of the tread portion to join the respective inextensible beads. The supporting carcass acts as a supporting structure for the tread portion and sidewalls and typically contains a barrier layer (rubber layer). The sealant layer is disposed between said supporting carcass and said innerliner layer and therefore between said barrier layer (which is typically a component of said carcass) and said innerliner layer. The outer circumferential tread is adapted to be ground contacting when the tire is in use.

The following examples are included to further illustrate the method of manufacturing the self-sealing pneumatic rubber tires of this invention. These examples are intended to be representative of the present invention and are not to be regarded as limiting the scope of the invention or the manner in which it can be practiced. Unless specifically indicated otherwise, parts and percentages are given by weight.

EXAMPLE I

Illustrative butyl rubber-based sealant precursor compositions (compounds) are prepared by mixing ingredients in an internal mixer. The ingredients are mixed in a first, non-productive, mixing stage without the organoperoxide followed by a second, productive, mixing stage in which the organoperoxide(s) is (are) added subsequent to addition of a precipitated silica and polyethylene glycol. The ingredients are illustrated in Table 1.

Control Compound A represents a sealant precursor composition using 12 parts of 4,4-di-(tertiary butylperoxy) valerate (Valerate).

Comparative Compound B represents the sealant precursor composition which contains 12 parts of dicumyl peroxide, namely a higher decomposition temperature organoperoxide (dicumyl peroxide).

Experimental Compound C represents a sealant precursor composition which is similar to Comparative Compound B except that an increased amount of 14 phr of dicumyl peroxide is used.

Experimental Compound D represents a sealant precursor composition which contains a combination of a minor amount of one part of 4,4-di-(tertiary butylperoxy) valerate (organoperoxide Valerate) and a major amount of 12 parts dicumyl peroxide.

Experimental Compound E represents a sealant precursor rubber composition which contains a combination of an increased minor amount of two parts of 4,4-di-(tertiary butylperoxy) valerate and 12 parts dicumyl peroxide.

Various physical properties are reported in the Following Table 2 in which the parts and percentages are by weight unless otherwise indicated.

TABLE 1

| Material | Control | | Experimental | | |
|---|---|---|---|---|---|
| | A | B | C | D | E |
| First (Non-Productive) Mixing Step (to about 120° C.) | | | | | |
| Butyl rubber[1] | 100 | 100 | 100 | 100 | 100 |
| Precipitated, amorphous silica[2] | 20 | 20 | 20 | 17 | 17 |
| Clay[3] | 10 | 10 | 10 | 10 | 2 |
| Polyethylene glycol[4] | 0.25 | 0.25 | 0.25 | 0.25 | 0.25 |
| Rubber processing oil[5] | 3 | 3 | 3 | 3 | 3 |
| Colorant as a yellow colored pigment masterbatch[6] | 1 | 1 | 1 | 1 | 1 |

TABLE 1-continued

|  | Control | | Experimental | | |
|---|---|---|---|---|---|
| Material | A | B | C | D | E |
| Second (Productive) Mixing Step (to about 93° C.) | | | | | |
| Organoperoxide (Valerate)[7] | 12 | 0 | 0 | 1 | 2 |
| Organoperoxide (Dicumyl peroxide)[8] | 0 | 12 | 14 | 12 | 12 |
| Modulus G' 5% strain, kPa[9] | 20.7 | 25.5 | 25.2 | 19.1 | 17.2 |

[1]Butyl rubber as Exxon 068 ™ from the ExxonMobil Company, having a Mooney (1 + 8) viscosity at 125° C. of about 51, as a copolymer of isobutylene and isoprene having less than one percent units derived from isoprene
[2]Amorphous precipitated silica as Hubersil 4155 ™ from J. M. Huber Company
[3]Kaolin clay as RC-32 ™ from Thiele Kaolin Company
[4]Polyethylene glycol having a weight average molecular weight of about 8,000 (understood to be about plus or minus about 1,000) as Carbowax PEG 8000 ™ from the Dow Chemical Company
[5]Rubber processing oil as Tufflo 100 ™ from Barton Solvents Company reportedly a naphthenic, paraffinic rubber processing oil having a maximum aromatic content of less than 15 weight percent
[6]A yellow colored organic/inorganic pigment as Akrosperse E-6837 ™ yellow EPMB pigment masterbatch with EPR (ethylene/propylene rubber), in a 50/50 weight ratio of yellow pigment to EPR, from the Akrochem Company and reported in Table 1 as the composite.
[7]Organoperoxide (Valerate) as a composite of 4,4'-di-(tertiary butylperoxy) valerate and a mineral carrier as a combination of calcium carbonate and calcium silicate containing about 40 weight percent of the organoperoxide (thus being 40 percent active insofar at the organoperoxide is concerned) as Link Cup NBV 40C ™ from the Geo Specialty Chemical Company and reported in Table 1 as the composite.
[8]Organoperoxide (Dicumyl peroxide) as a composite of dicumyl peroxide and a mineral carrier as a combination of calcium carbonate and calcium silicate containing about 40 weight percent of the dicumyl peroxide (thus being 40 percent active insofar as the organoperoxide is concerned) as Luperox DCP40P ™ from the Arkema company and reported in Table 1 as the composite.
[9]The storage modulus (G') for the sealant composition (after organoperoxide depolymerization of the butyl rubber in the sealant precursor composition) G' at a 5 percent dynamic strain at 100° C. and 1 Hertz The Compounds (Sealant precursor compounds) A through D were heated to a temperature of about 150° C. for about 30 minutes to at last partially depolymerize the butyl rubber in the presence of the organoperoxide(s) which is viewed as a somewhat average cure conditions for a light truck tire.

From Table 1 it can be seen that the precipitated silica in the butyl rubber composition was mixed with the polyethylene glycol prior to addition of an organoperoxide. The purpose was to reduce, or inhibit, both reaction of the organoperoxide with the surface of the silica (e.g. hydroxyl groups on the silica) and the aforesaid unwanted absorbance of the organoperoxide onto the silica.

From Table 1 it can be seen that for Control rubber Compound A which used 4,4'-di-(tertiary butylperoxy) valerate to depolymerize the butyl rubber in the silica-containing butyl rubber composition, the modulus G' was reduced to a value of 20.7 kPa which is considered herein to be satisfactory for a tire built-in sealant layer to resist air leakage caused by a puncturing object such as, for example, a nail.

For Comparative rubber Compound B which used dicumyl peroxide to depolymerize the butyl rubber in the silica-containing butyl rubber composition, the storage modulus G' was reduced to a value of 25.5 kPa which, while being considered herein to be somewhat satisfactory for a tire built-in sealant layer to resist air leakage caused by a puncturing object such as, for example, a nail, it did not reach the G' reduced value of 20.7 kPa achieved by use of the 4,4'-di-(tertiary butylperoxy) valerate.

For Experimental rubber Compound C it can be seen that for an increase in the dicumyl peroxide content to 14 phr from 12 phr used in Comparative Compound G, had little effect upon the modulus (G') property which remained about the same, namely that the G' value decreased slightly to a value of 25.2 kPa from a value of 25.5 kPa.

It was therefore desired to conduct an experiment to see what effect upon the modulus G' might be rendered by use of a combination of a very small amount of 4,4'-di-(tertiary butylperoxy) valerate and significantly greater amount of dicumyl peroxide relative to the valerate for depolymerizing the butyl rubber in the polyethylene glycol treated silica-containing butyl rubber based sealant precursor rubber composition.

For such purpose, Experimental rubber Compound D was prepared with a ratio of 1/12 of the 4,4'-di-(tertiary butylperoxy) valerate to the dicumyl peroxide.

It can be seen that Experimental rubber Compound D, with its combination of 4,4'-di-(tertiary butylperoxy) valerate and dicumyl peroxide in a ratio of 1/12 to depolymerize the butyl rubber in the silica-containing butyl rubber composition, the modulus (G') was significantly reduced to a value of 19.1 kPa which was well below the modulus (G') value of 20.7 kPa achieved by use of the 4,4'-di-(tertiary butylperoxy) valerate alone and is considered herein to be suitable for a tire built-in sealant layer to resist air leakage caused by a puncturing object such as, for example, a nail.

It is considered herein that this is indicative of a surprising discovery of an unexpected synergistic effect achieved by a cooperative combination of the 4,4'-di-(tertiary butylperoxy) valerate to initiate the free radical formation and dicumyl peroxide to propagate the free radical formation and associated butyl rubber depolymerization.

While the mechanism is not fully understood, it seems apparent that a butyl rubber depolymerization effect by the 4,4'-di-(tertiary butylperoxy) valerate with its early free radical generation served to synergistically promote an initiation of the depolymerization of the butyl rubber. It seems apparent that a subsequent activation of free radical generation by the dicumyl peroxide served to dynamically increase the depolymerization of the butyl rubber within the sealant precursor after the aforesaid initiation of the depolymerization effect by the valerate. The synergy was unexpected and considered to be a significant discovery which would not have been accomplished without the experimental evaluation.

It was then desired to conduct an experiment to see if the modulus (G') could be effectively reduced by use of an increased amount, but still small amount, of the 4,4'-di-(tertiary butylperoxy) valerate.

Experimental rubber Composition E was therefore prepared in which 2 parts (an increase from 1 part) of the valerate peroxide was used which resulted in a ratio of 4,4'-di-(tertiary butylperoxy) valerate to dicumyl peroxide of 2/12 instead of 1/12.

It can be seen that for Experimental Compound E the modulus (G') was reduced even further to a value of 17.2 kPa from 19.1 kPa value obtained for Experimental Compound D which is clearly and significantly below the modulus (G') value of 20.7 kPa where the 4,4'-di-(tertiary butylperoxy) valerate was used alone for Control rubber Composition A.

It is considered herein that this is further indicative of an unexpected discovery of a synergistic effect achieved by a cooperative combination of the very small amount of 4,4'-di-(tertiary butylperoxy) valerate free radical initiation and considerably larger amount of dicumyl peroxide free radical propagation for the silica-containing butyl rubber depolymerization The aforesaid modulus (G') physical properties were determined at a 5 percent dynamic strain at 1 hertz at 100° C. by an RPA (Rubber Process Analyzer) instrument. The measurement was made after a 30 minute heating of the rubber sample at 150° C. to yield a delta G' (at a 5 percent dynamic strain) for the depolymerization reaction. The Rubber Process Analyzer instrument used was RPA 2000™ instrument by Alpha Technologies, formerly the Flexsys Company and formerly the Monsanto Company.

EXAMPLE II

A tubeless pneumatic steel belted medium radial truck tire of the type G287 11822.5 is prepared by first applying a standard butyl rubber innerliner layer (e.g. bromobutyl rubber composition) to a standard building drum. Then a layer of butyl rubber-based sealant precursor of the composition of Compound D of Example I having a thickness of about 0.76 cm (about 0.3 inches) is applied to the innerliner rubber layer on the building drum followed by application of diene rubber based carcass components, including the carcass plies, tread, sidewalls and beads, to form the uncured, or green, tire construction, or assembly, which contains the built-in butyl rubber-based sealant precursor layer covered by the innerliner rubber layer.

The green tire is cured in a suitable tire curing mold at an elevated temperature to form a tire with a built-in sealant layer having a thickness of about 0.38 cm (about 0.15 inches) formed by a partial (substantial) depolymerization of the butyl rubber-based sealant precursor layer by the organoperoxide at an elevated tire cure temperature.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a pneumatic tire having a puncture sealing ability as an assembly of components comprised of an outer circumferential rubber tread, rubber carcass supporting said tread and an inner rubber tire innerliner layer, wherein said method comprises:
   (A) positioning a layer of uncured butyl rubber based composition as a sealant precursor between said innerliner and rubber carcass, wherein said sealant precursor butyl rubber based composition is prepared by blending:
      (1) butyl rubber, and
      (2) a combination of organoperoxides comprised of:
         (a) 4,4-di-(tertiary butylperoxy) valerate, and
         (b) dicumyl peroxide;
      wherein the ratio of dicumyl peroxide to 4,4-di-(tertiary butylperoxy) valerate is provided as a weight ratio in a range of from about 6/1 to about 12/1, and
      wherein organoperoxides are said 4,4-di-(tertiary butylperoxy) valerate and dicumyl peroxide with less than about 10 percent of the organoperoxides being organoperoxides other than said 4,4-di-(tertiary butylperoxy) valerate and dicumyl peroxide, and
      (3) reinforcing filler comprised of:
         (a) precipitated silica, or
         (b) precipitated silica and carbon black;
      (4) a colorant other than a black color wherein said carbon black is excluded or is present in a minimal amount so long as said colorant-containing sealant precursor is of a color other than black;
      wherein said precipitated silica is:
         (1) a precipitated silica pre-treated with polyethylene glycol, or
         (2) a precipitated silica treated in situ within said rubber composition with polyethylene glycol prior to addition of said 4,4-di-(tertiary butylperoxy) valerate and dicumyl peroxide;
      wherein said polyethylene glycol has a weight average molecular weight in a range of from about 2,000 to about 15,000;
   (B) curing said assembly of components in a suitable mold at an elevated temperature to form a pneumatic tire and to cause said butyl rubber of said sealant precursor to partially depolymerize said butyl rubber by said combination of said 4,4-di-(tertiary butylperoxy) valerate and dicumyl peroxide and thereby form a built-in sealant layer within said tire
   wherein said butyl rubber depolymerization is initiated by said 4,4-di(tertiary butylperoxy) valerate and propagated by said dicumyl peroxide and 4,4-di(tertiary butylperoxy) valerate.

* * * * *